US009459775B2

(12) United States Patent
Kuscher (10) Patent No.: US 9,459,775 B2
(45) Date of Patent: Oct. 4, 2016

(54) POST-TOUCHDOWN USER INVISIBLE TAP TARGET SIZE INCREASE

(71) Applicant: Google Inc., Mountain View, CA (US)

(72) Inventor: Alexander Friedrich Kuscher, San Francisco, CA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 13/665,732

(22) Filed: Oct. 31, 2012

(65) Prior Publication Data

US 2014/0123060 A1 May 1, 2014

(51) Int. Cl.
*G06F 3/048* (2013.01)
*G06F 3/0484* (2013.01)
*G06F 3/0488* (2013.01)

(52) U.S. Cl.
CPC ......... *G06F 3/04842* (2013.01); *G06F 3/0488* (2013.01); *G06F 2203/04805* (2013.01)

(58) Field of Classification Search
None
See application file for complete search history.

(56) References Cited

U.S. PATENT DOCUMENTS

| 5,736,974 | A | 4/1998 | Selker |
| 6,259,436 | B1 * | 7/2001 | Moon ........................... 345/173 |
| 8,111,244 | B2 | 2/2012 | Lee et al. |
| 8,386,965 | B2 * | 2/2013 | Fleizach et al. ............. 715/865 |
| 2003/0122856 | A1 * | 7/2003 | Hubbard ....................... 345/700 |
| 2005/0024341 | A1 | 2/2005 | Gillespie et al. |
| 2006/0132460 | A1 | 6/2006 | Kolmykov-Zotov et al. |
| 2007/0094614 | A1 | 4/2007 | Kawamoto et al. |
| 2008/0259040 | A1 | 10/2008 | Ording et al. |
| 2008/0284756 | A1 | 11/2008 | Hsu et al. |
| 2009/0303187 | A1 | 12/2009 | Pallakoff |
| 2009/0319935 | A1 * | 12/2009 | Figura ........................... 715/773 |
| 2010/0115398 | A1 * | 5/2010 | Yi ................................ 715/234 |
| 2011/0083104 | A1 * | 4/2011 | Minton ......................... 715/815 |
| 2013/0328788 | A1 * | 12/2013 | Wibbeler ....................... 345/173 |

FOREIGN PATENT DOCUMENTS

EP 0476972 A2 3/1992

* cited by examiner

*Primary Examiner* — Jeffrey A Gaffin
*Assistant Examiner* — Nhat-Huy T Nguyen
(74) *Attorney, Agent, or Firm* — McDermott Will & Emery LLP (57) ABSTRACT

The subject technology discloses configurations for providing detecting a first touch input on a touch-sensitive screen, wherein the first touch input corresponds with a position on the touch-sensitive screen. The subject technology further determines if the position of the first touch input is within a predetermined distance of a tap target area associated with a graphical element. The tap target area is then expanded by a predetermined amount to increase an area of the tap target area. The subject technology receives a second touch input on the touch-sensitive screen, wherein the second touch input corresponds with a second position on the touch-sensitive screen. It is determined if the position of the second touch input is within the expanded tap target area. The subject technology then selects the graphical element in response to the position of the second touch input being within the expanded tap target area.

20 Claims, 7 Drawing Sheets

POST-TOUCHDOWN USER INVISIBLE TAP TARGET SIZE INCREASE

BACKGROUND

The subject technology generally relates to graphical user interfaces involving a touchscreen.

SUMMARY

The subject technology provides for detecting a first touch input on a touch-sensitive screen, wherein the first touch input corresponds with a position on the touch-sensitive screen; determining if the position of the first touch input is within a predetermined distance of a tap target area associated with a graphical element; expanding the tap target area by a predetermined amount to increase an area of the tap target area; receiving a second touch input on the touch-sensitive screen, wherein the second touch input corresponds with a second position on the touch-sensitive screen; determining if the position of the second touch input is within the expanded tap target area; and selecting the graphical element in response to the position of the second touch input being within the expanded tap target area.

The subject technology provides for detecting a first touch input on a touch-sensitive screen, wherein the first touch input corresponds with a position on the touch-sensitive screen; determining if the position of the first touch input is within a predetermined distance of a plurality of tap target areas respectively associated with a plurality of graphical elements; identifying a tap target area among the plurality of tap target areas that is closer to the position of the first touch input; expanding the tap target area by a predetermined amount to increase an area of the tap target area; receiving a second touch input on the touch-sensitive screen, wherein the second touch input corresponds with a second position on the touch-sensitive screen; determining if the position of the second touch input is within the expanded tap target area; and selecting the graphical element in response to the position of the second touch input being within the expanded tap target area.

Yet another aspect of the subject technology provides a system. The system includes memory, one or more processors, and one or more modules stored in memory and configured for execution by the one or more processors. The system includes a tap target module configured to detect first touch input on a touch-sensitive screen, wherein the first touch input corresponds with a position on the touch-sensitive screen, determine if the position of the first touch input is within a predetermined distance of a tap target area associated with a graphical element, expand the tap target area by a predetermined amount to increase an area of the tap target area, receive a second touch input on the touch-sensitive screen, wherein the second touch input corresponds with a second position on the touch-sensitive screen, and determine if the position of the second touch input is within the expanded tap target area. The system further includes a graphical user interface (GUI) display module configured to select the graphical element in response to the position of the second touch input being within the expanded tap target area.

The subject technology further provides for a non-transitory machine-readable medium comprising instructions stored therein, which when executed by a machine, cause the machine to perform operations including detecting a first touch input on a touch-sensitive screen, wherein the first touch input corresponds with a position on the touch-sensitive screen; determining if the position of the first touch input is within a predetermined distance of a plurality of tap target areas respectively associated with a plurality of graphical elements; determining respective distances from the position of the first touch input to the respective tap target area of the plurality of tap target areas; determining a smallest respective distance among the respective distances from the position of the first touch input; identifying a respective tap target area associated with a respective graphical element among the plurality of graphical elements that corresponds to the smallest respective distance; expanding the respective tap target area by a predetermined amount to increase an area of the tap target area; receiving a second touch input on the touch-sensitive screen, wherein the second touch input corresponds with a second position on the touch-sensitive screen; determining if the position of the second touch input is within the expanded tap target area; and selecting the graphical element in response to the position of the second touch input being within the expanded tap target area.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Computing devices with touch-sensitive screens (e.g., a touchscreen) are popular products in the consumer space. Computing devices with touch-sensitive screens have given rise to software applications that accept touch-based interactions. For instance, a user may provide touch input on a touch-sensitive screen to select a graphical element in a user interface for an application running on the computing device. Touch input may include a tap input to press or select a graphical element, or a swipe or drag to move a selected graphical element, etc.

Interacting with websites on a touch-sensitive screen may be problematic. A website designer or programmer cannot be expected to consistently follow design principles for configuring a web page for a touch-based user interface. Thus, due to poor or improper design choice, a user may have difficulty in selecting graphical elements on a given website displayed on a touch-sensitive screen. Moreover, the user cannot be expected to interact with the website with a precision of a machine or robot. As an illustration, the user may attempt to select a graphical element on the website and subsequently move off the graphical element from natural arm or hand movement. The difficulty of selecting the graphical element may be compounded by other factors, such as the user being required to interact with the website while the user's hand or arm is situated in mid-air from holding the computing device. Although the foregoing discussion relates to a device with a touch-sensitive screen, the same issues may arise for the user when utilizing a touchpad/trackpad for accessing the website.

In a graphical user interface for handling touch input, one or more selectable graphical elements may be provided. For instance, a web page may include one or more graphical elements such as a button, check box, radio button, slider, list box, drop-down list, menu, combo box, icon, text box, scroll bar, etc. Each graphical element in the webpage may correspond with an invisible area called a tap target area that represents a portion of the touchscreen that enables the graphical element to be selected by an initial touch input, such as a single finger gesture that constitutes tapping, which indicates pressing or selecting a graphical element. In some instances, the tap target area encloses the graphical element. However, a size of the tap target area may be set so that if the user moves the user's arm or hand after the initial touch input (e.g., wiggle movement), then the graphical element may no longer selected, or another graphical element may be selected that is not intended.

The subject technology addresses the aforementioned issues by increasing a size of a tap target area automatically upon receiving an initial touch input without requiring a publisher of a website to permanently change one or more web pages (or any associated code). The size of the tap target area may be increased by a predetermined amount, such as 25%. The tap target area may be defined by a set of coordinates corresponding to a portion of a display area of a touchscreen. By way of example, the display area may be represented as a two-dimensional space including horizontal and vertical axes (e.g., x-axis and y-axis) that intersect at a common origin point (e.g., 0.0, 0.0).

In one example, the subject technology detects a first touch input from a user on a touch-sensitive screen in which the first touch input corresponds with a position on the touch-sensitive screen. If the position of the first touch input is determined to be within a predetermined distance of a tap target area associated with a graphical element, then the tap target area is expanded by a predetermined amount to increase an area of the tap target area. Upon receiving a second touch input on the touch-sensitive screen in which the second touch input corresponds with a second position on the touch-sensitive screen, it is then determined if the position of the second touch input is within the expanded tap target area. The graphical element is then selected in response to the position of the second touch input being within the expanded tap target area. For instance, the graphical element is selected after the user has released the user's finger indicating a release of the touch input.

In an example in which several graphical elements are clustered closely together, the subject technology also may expand a size of a tap target area in a similar manner. For instance, the subject technology detects a first touch input on a touch-sensitive screen in which the first touch input corresponds with a position on the touch-sensitive screen. If the position of the first touch input is within a predetermined distance of several tap target areas respectively associated with several graphical elements, the subject technology identifies a tap target area among the tap target areas that is closer (or closest) to the position of the first touch input. The identified tap target area is then expanded by a predetermined amount to increase an area of the tap target area. A second touch input on the touch-sensitive screen may then be received in which the second touch input corresponds with a second position on the touch-sensitive screen and a gesture from the position of the first touch input. It is then determined if the position of the second touch input is within the expanded tap target area. The subject technology selects the graphical element in response to the position of the second touch input being within the expanded tap target area.

Figure 1:
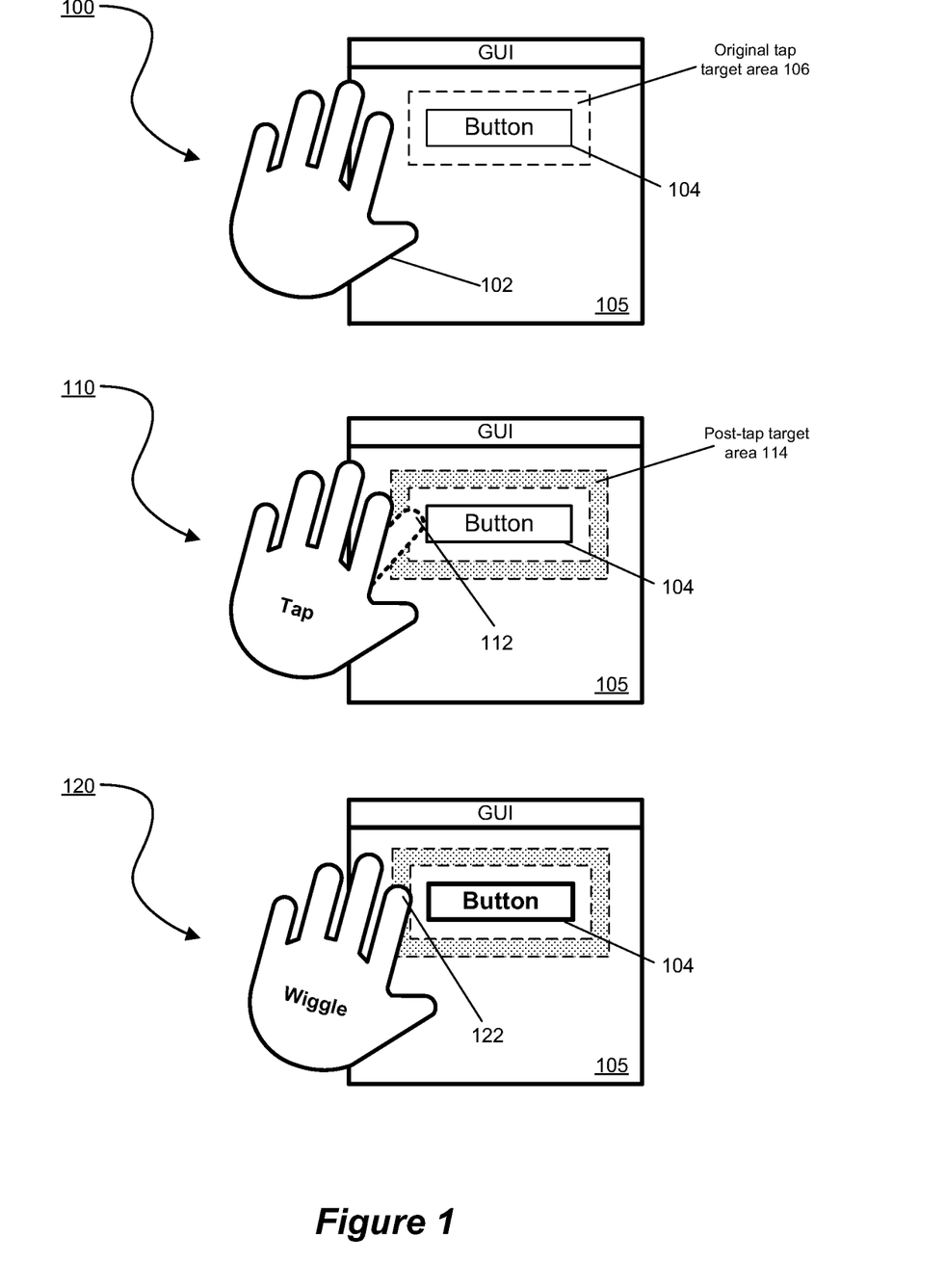
FIG. 1 conceptually illustrates example interactions with a graphical user interface (GUI) for expanding a size of a tap target area of a graphical element in which some configurations of the subject technology can be implemented.

FIG. 1 conceptually illustrates example interactions with a graphical user interface (GUI) 105 for expanding a size of a tap target area of a graphical element in which some configurations of the subject technology can be implemented. As illustrated in the example shown in FIG. 1, a graphical element 104 included in the GUI 105 is provided for display. A graphical element can include, but is not limited to, a button, check box, radio button, slider, list box, drop-down list, menu, combo box, icon, text box, scroll bar, etc. The GUI 105 illustrated in FIG. 1 may be provided on one or more computing devices or systems. Additionally, the GUI 105 may be provided on a computing device or system with a touchscreen. The touchscreen in some configurations includes a total display area for displaying graphical elements as part of the GUI 105, which may correspond with an application (e.g., web browser) running on the computing device or system.

As illustrated in the example of FIG. 1, configurations of the GUI 105 for a touchscreen are shown in different stages 110, 120 and 130. The GUI 105 may be provided by an operating system or application running on the operating system and configured to accept touch input from a user to interact with a graphical element(s) provided by the GUI 105.

As shown in the stage 100, the GUI 105 includes a graphical element 104 corresponding to a button. An original tap target area 106 is configured for the graphical element 104 in the GUI 105. A user's hand 102 may select the graphical element 104 by applying touch input within the original tap target area 106. In some configurations, the original target area 106 is an invisible area in the GUI 105 that corresponds with a display area that, upon receiving input (e.g., touch input), selects the graphical element 104. In an example where a display area of the graphical element 104 is represented as an area A, the display area of the original tap target area 106 may be represented by an area c×A, where c is a value greater than 1 that represents a value by which the area A is multiplied. The area A may be expressed in a number of pixels, such as 1024 pixels in one example. In another example, the area A may be expressed as a respective width and height of pixels, such as 32×32 pixels.

In the stage 110, the user has provided touch input via pressing down a finger at a position 112 on the touchscreen that is within the original tap target area 106. After receiving the user's touch input, a post-tap target area 114 is provided in a display area that encloses the original tap target area 106. In some configurations, the post-tap target area 114 is an expanded and invisible display area from the original tap target area that accepts touch input for selecting the corresponding graphical element (e.g., button 104). Thus, touch input within the post-tap target area 114 enables selection of a corresponding graphical element outside of the graphical element's original tap target area. Although illustrated as a contiguous display area with the original tap target area 106 in the example of FIG. 1, it is appreciated that the post-tap target area 114 may be part of the display area of the original tap target area 106 in some configurations.

In the stage 120, while still having the user's finger disposed on the touchscreen, the user has moved ("wiggle" movement) the user's finger to a position 122 on the touchscreen. The position 122 corresponds to a different position than the position 112 shown in the stage 110. As shown, the position 122 of the user's finger is within the post-tap target area 114 and the graphical element 104 is selected. In some configurations, the user may then release the user's finger from the touchscreen to activate the selected graphical element 104. Other ways to activate the selected graphical element 104 may be provided and still be within the scope of the subject technology.

Although the example shown in FIG. 1 illustrates the GUI 105 in a particular arrangement, other types of arrangements for displaying the GUI 105 could be provided and still be within the scope of the subject technology. Additionally, the GUI 105 could include more graphical elements than shown in the example of FIG. 1. For instance, the GUI 105 could include additional graphical elements that may be selectable via touch input.

Figure 2:
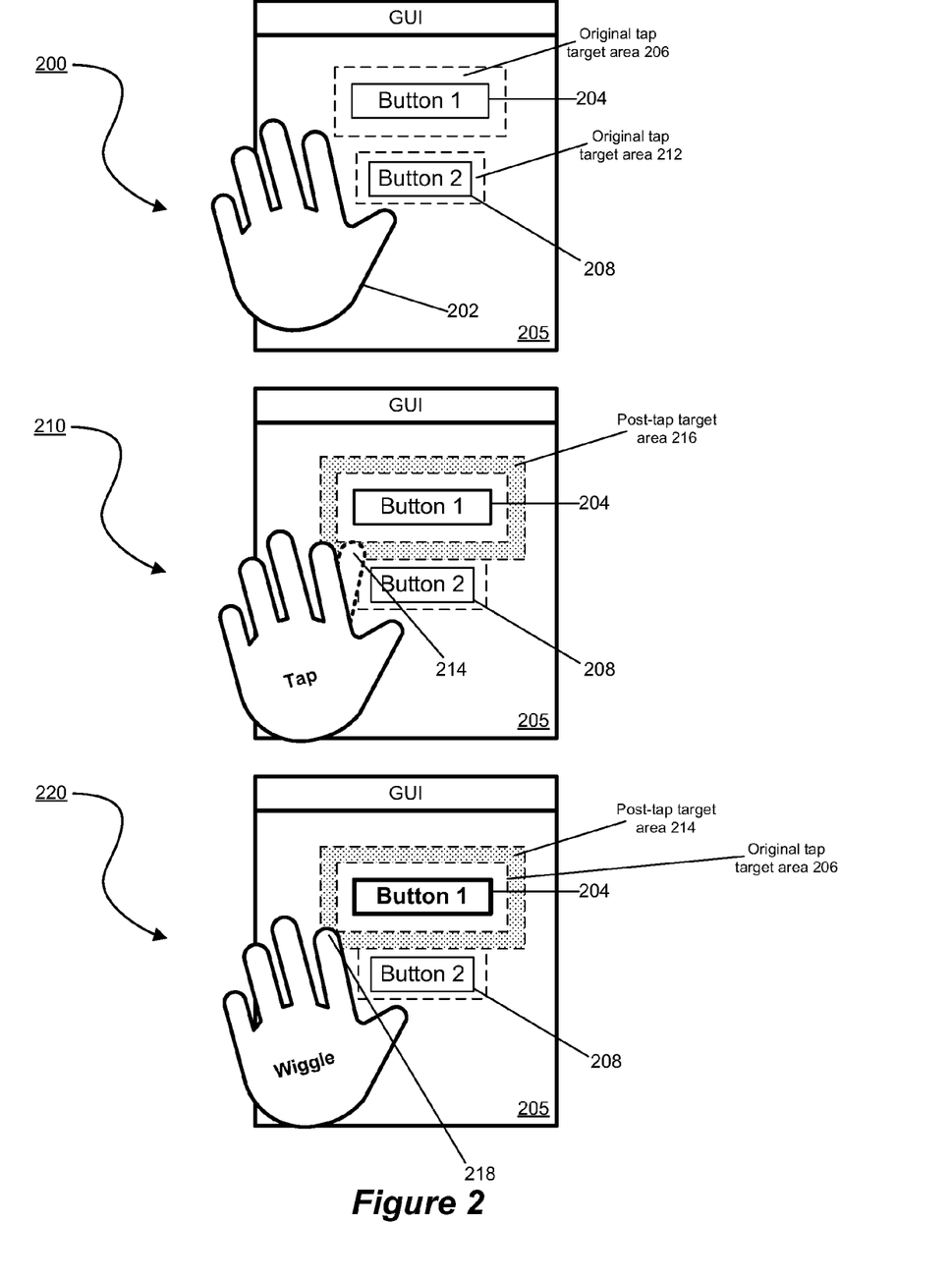
FIG. 2 conceptually illustrates example interactions with a graphical user interface for expanding a size of a tap target area of a graphical element among multiple graphical elements in which some configurations of the subject technology can be implemented.

FIG. 2 conceptually illustrates example interactions with a graphical user interface (GUI) 205 for expanding a size of a tap target area of a graphical element among multiple graphical elements in which some configurations of the subject technology can be implemented. As illustrated in the example shown in FIG. 2, graphical elements 204 and 208 included in the GUI 205 are provided for display. The GUI 205 illustrated in FIG. 2 may be provided on one or more computing devices or systems. Additionally, the GUI 205 may be provided on a computing device or system with a touchscreen.

As illustrated in the example of FIG. 2, configurations of the GUI 205 for a touchscreen are shown in different stages 200, 210 and 220. The GUI 205 may be provided by an operating system or application running on the operating system and configured to accept touch input from a user to interact with a graphical element(s) provided by the GUI 205.

In the stage 200, graphical elements 204 and 208 are provided in the GUI 205. Each of the graphical elements 204 and 208 have corresponding original tap target areas for selecting the graphical element. As illustrated, an original tap target area 206 corresponds with the graphical element 204, and an original tap target area 206 corresponds with the graphical element 208. The graphical elements 204 and 208 are positioned to cover respective display areas within the GUI 205. A user's hand 202 may provide touch input on the touchscreen for selecting the graphical elements in the GUI 205.

In the stage 210, the user has provided touch input via pressing down a finger at a position 214 on the touchscreen that is within the original tap target area 206. Based on the position 214 from graphical elements provided in the GUI 205, the subject technology may expand the original tap target area 208 corresponding to the graphical element 204. In one example, determining whether to expand the original tap target area 208 is calculated according to a distance between the position 214 and the original tap target area 206. Other ways determine whether to expand a respective original tap target area corresponding to a respective graphical element may be provided and still be within the scope of the subject technology.

In the stage 220, while still having the user's finger disposed on the touchscreen, the user has moved ("wiggle" movement) the user's finger to a position 218 on the touchscreen. The position 218 corresponds to a different position than the position 214 shown in the stage 210. As shown, the position 218 of the user's finger is within the post-tap target area 214 and the graphical element 204 is selected. In some configurations, the user may then release the user's finger from the touchscreen to activate the selected graphical element 204. Other ways to activate the selected graphical element 204 may be provided and still be within the scope of the subject technology.

Figure 3:
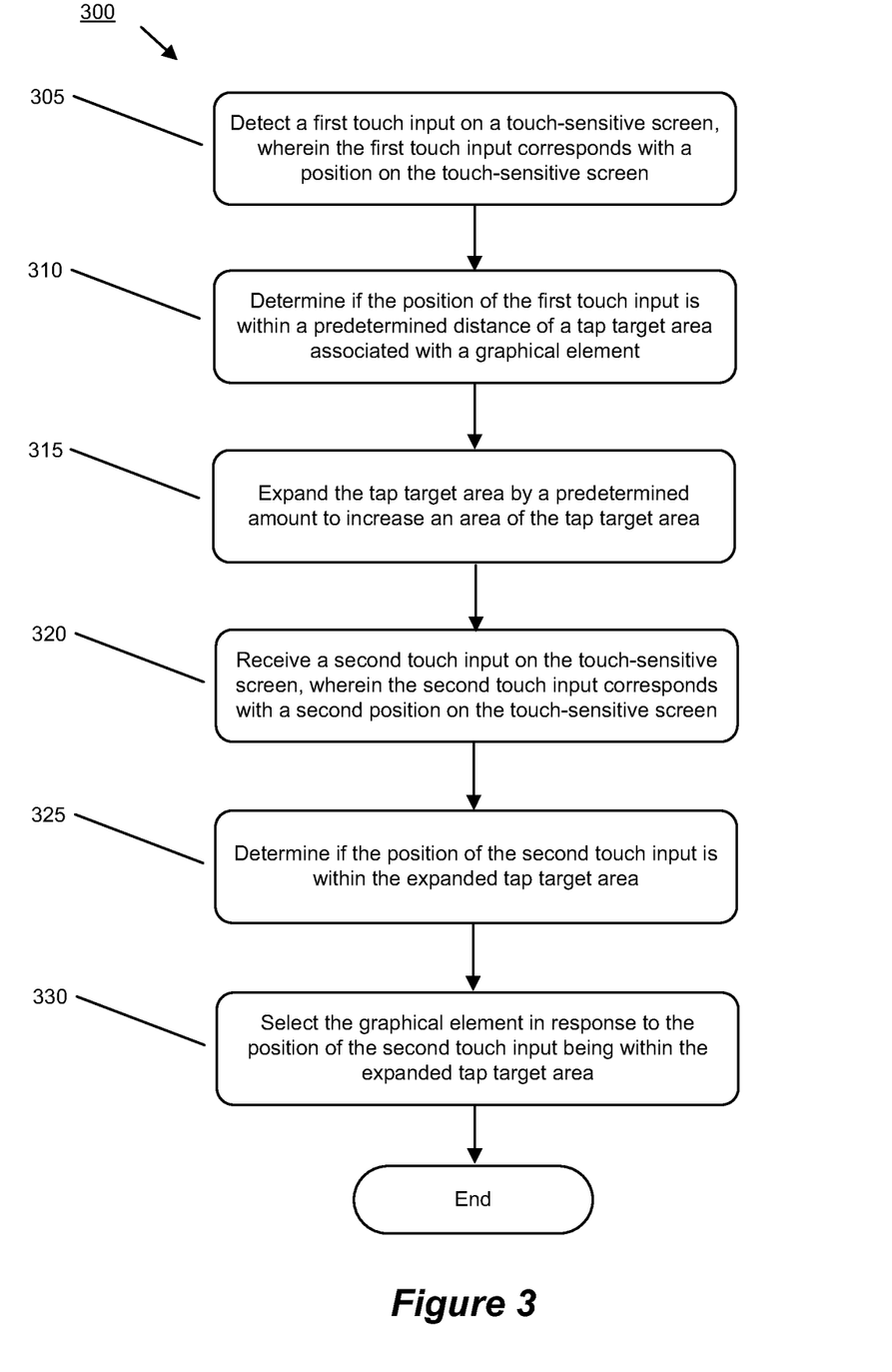
FIG. 3 conceptually illustrates an example process for expanding a size of a tap target area of a graphical element according to some configurations of the subject technology.

FIG. 3 conceptually illustrates an example process 300 for expanding a size of a tap target area of a graphical element according to some configurations of the subject technology. The process 300 can be performed on one or more computing devices or systems in some configurations. More specifically, the process 300 may be implemented for expanding a size of a tap target area of a graphical element as described in the example of FIG. 1.

The process 300 starts at 305 by detecting a first touch input on a touch-sensitive screen. The first touch input corresponds with a position on the touch-sensitive screen in one example. In some configurations, the first touch input is a tap input on the touch-sensitive screen.

The process 300 at 310 determines if the position of the first touch input is within a predetermined distance of a tap target area associated with a graphical element. In one example, the graphical element is provided on a web page and/or by a user interface of an application. The graphical element is a button or another type of a selectable interface object in some configurations.

At 315, the process 300 expands the tap target area by a predetermined amount to increase an area of the tap target area.

The process 300 at 320 receives a second touch input on the touch-sensitive screen. In one example, the second touch input corresponds with a second position on the touch-sensitive screen. The position of the first touch input and the second position are different positions on the touch-sensitive screen in some configurations. For example, the second touch input may be a gesture from the position of the first touch input to the second position of the second touch input.

The process 300 at 325 determines if the position of the second touch input is within the expanded tap target area. At 330, the process 300 selects the graphical element in response to the position of the second touch input being within the expanded tap target area. The process 300 then ends.

Figure 4:
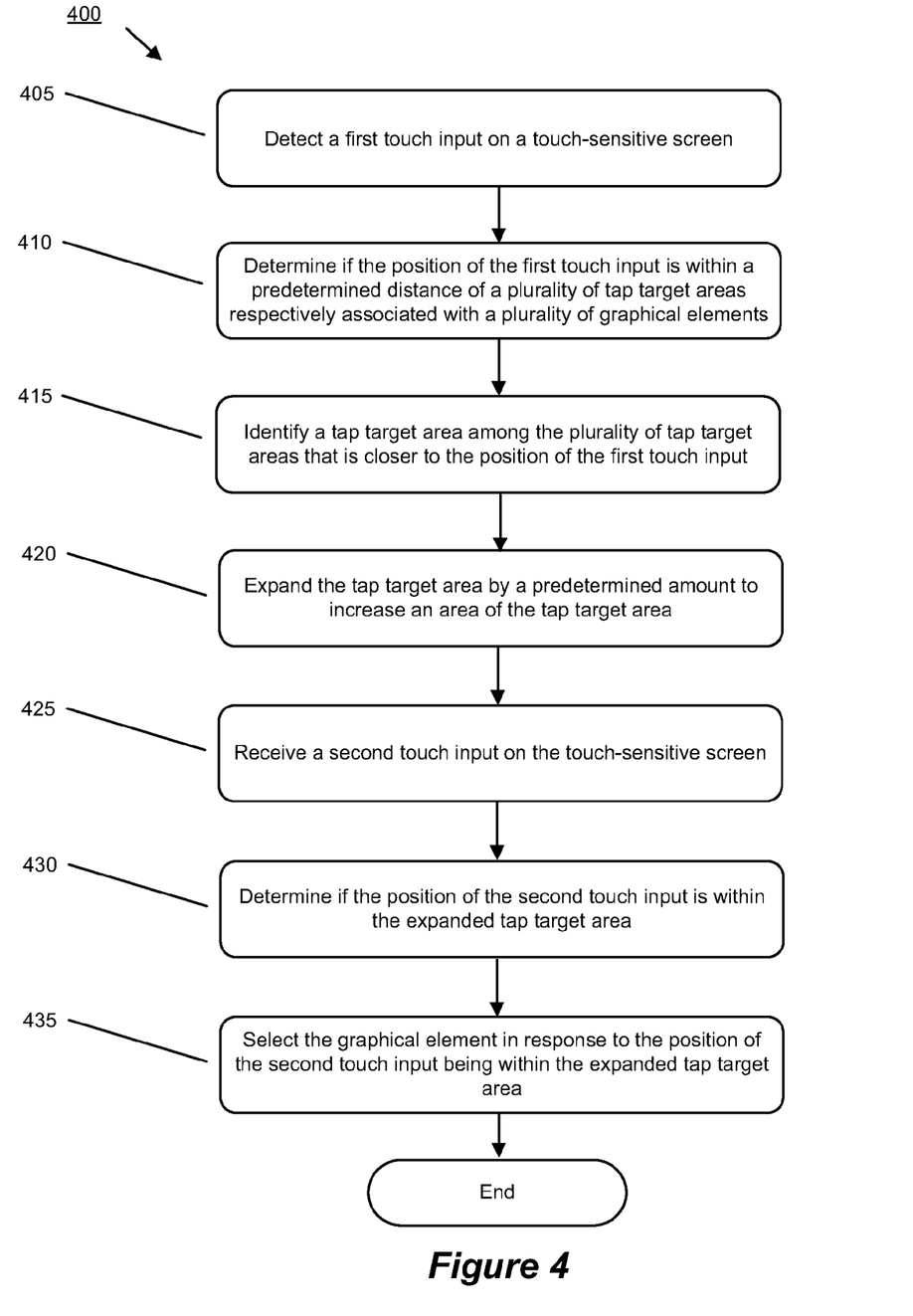
FIG. 4 conceptually illustrates an example process for expanding a size of a tap target area of a graphical element among multiple graphical elements in which some configurations of the subject technology can be implemented.

FIG. 4 conceptually illustrates an example process 400 for expanding a size of a tap target area of a graphical element among multiple graphical elements in which some configurations of the subject technology can be implemented. The process 400 can be performed by one or more computing devices or systems in some configurations. More specifically, the process 400 may be implemented for expanding a size of a tap target area of a graphical element as described in the example of FIG. 2.

The process 400 begins at 405 by detecting a first touch input on a touch-sensitive screen. In one example, the first touch input corresponds with a position on the touch-sensitive screen.

At 410, the process 400 determines if the position of the first touch input is within a predetermined distance of multiple tap target areas respectively associated with multiple graphical elements. In some configurations, the multiple graphical elements are provided in a graphical user interface (GUI), the GUI including a total display area, and each of the multiple graphical elements are arranged in different display areas within the total display area of the GUI. The predetermined distance is a distance based on a number of pixels in some configurations.

The process 400 at 415 identifies a tap target area among the multiple tap target areas that is closer to the position of the first touch input. Identifying the tap target area among the multiple tap target areas that is closer to the position of the first touch input may include determining respective distances from the position of the first touch input to the respective tap target area of the multiple tap target areas, determining a smallest respective distance among the respective distances from the position of the first touch input, and then identifying a respective tap target area associated with a respective graphical element among the multiple graphical elements that corresponds to the smallest respective distance.

The process 400 at 420 expands the tap target area by a predetermined amount to increase an area of the tap target area. In one example, the predetermined amount to increase the area of the tap target area comprises a coefficient to multiply the area of the tap target area. The coefficient is greater than 1 in some configurations.

The process 400 at 425 receives a second touch input on the touch-sensitive screen, in which the second touch input corresponds with a second position on the touch-sensitive screen. The second touch input may be a gesture from the position of the first touch input.

The process 400 at 430 determines if the position of the second touch input is within the expanded tap target area.

The process 400 at 435 selects the graphical element in response to the position of the second touch input being within the expanded tap target area. The process 400 then ends.

Figure 5:
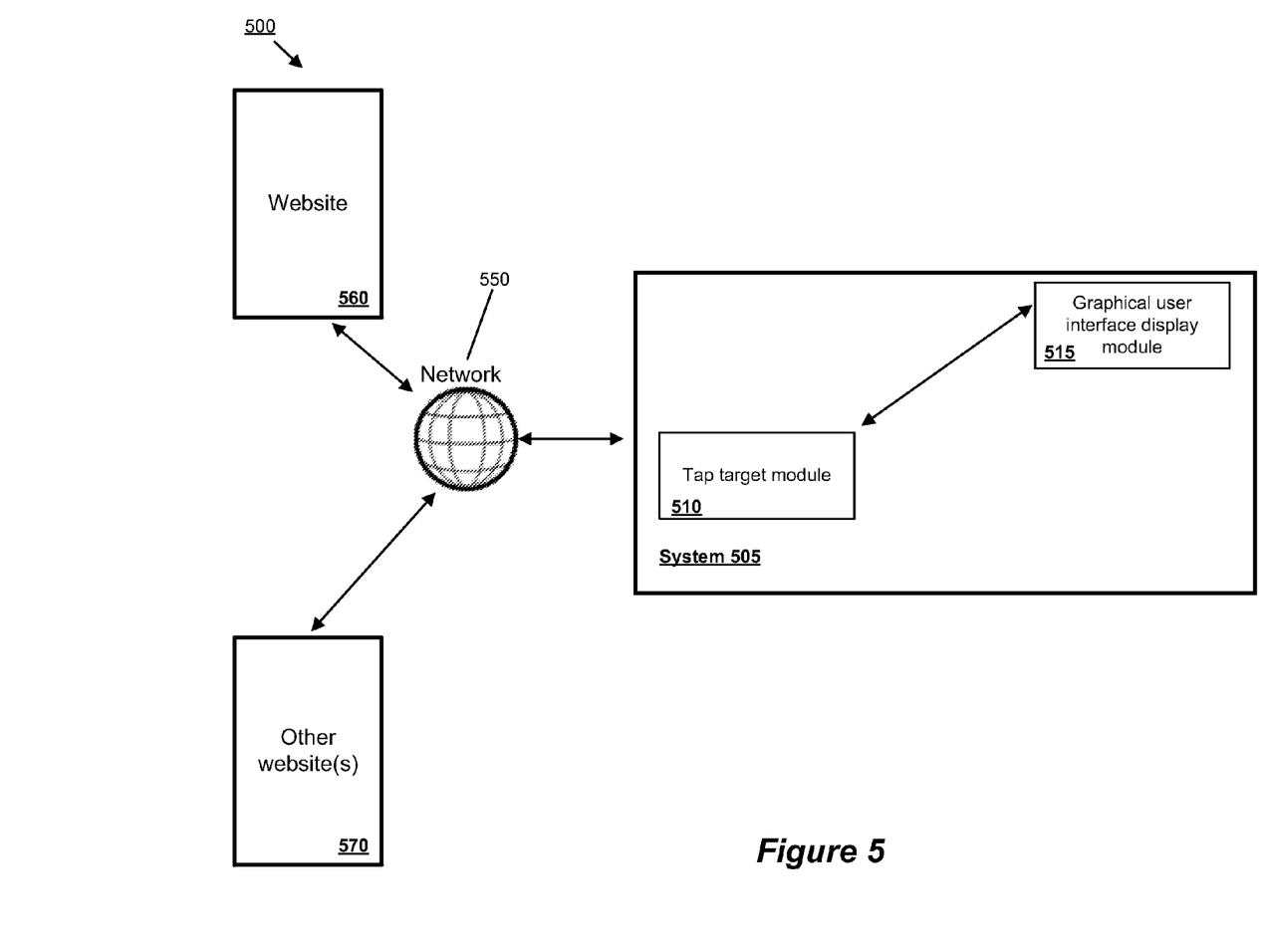
FIG. 5 conceptually illustrates an example computing environment including a system.

FIG. 5 conceptually illustrates an example computing environment 500 including a system. In particular, FIG. 5 shows a system 505 for implementing the above described GUI in FIGS. 1 and 2 and the processes in FIGS. 3 and 4. In some configurations, the system 505 is part of an implementation running a particular machine (e.g., client computer, laptop, notebook, netbook, etc.).

The system 505 can include memory, one or more processors, and one or more modules stored in memory and configured for execution by the one or more processors. As shown in FIG. 5, the system 505 includes several modules for providing different functionality. The system 505 is configured to include a tap target module 510 and a graphical user interface (GUI) display module 515.

The tap target module 510 is configured to detect a first touch input on a touch-sensitive screen in which the first touch input corresponds with a position on the touch-sensitive screen, determine if the position of the first touch input is within a predetermined distance of a tap target area associated with a graphical element, expand the tap target area by a predetermined amount to increase an area of the tap target area, receive a second touch input on the touch-sensitive screen in which the second touch input corresponds with a second position on the touch-sensitive screen, determine if the position of the second touch input is within the expanded tap target area. The GUI display module 515 is configured to select the graphical element in response to the position of the second touch input being within the expanded tap target area.

The tap target module 510 is further configured to detect a first respective touch input on a touch-sensitive screen in which the first respective touch input corresponds with a position on the touch-sensitive screen, determine if the position of the first respective touch input is within a predetermined distance of multiple of tap target areas respectively associated with multiple of graphical elements, identify a respective tap target area among the multiple of tap target areas that is closer to the position of the first respective touch input, expand the respective tap target area by a predetermined amount to increase an area of the respective tap target area, receive a second respective touch input on the touch-sensitive screen in which the second respective touch input corresponds with a second position on the touch-sensitive screen, and determine if the position of the second respective touch input is within the expanded respective tap target area. The GUI display module 515 is further configured to select the graphical element in response to the position of the second respective touch input being within the expanded respective tap target area. The tap target module 510 is further configured to determine respective distances from the position of the first respective touch input to the respective tap target area of the multiple of tap target areas, determine a smallest respective distance among the respective distances from the position of the first respective touch input, identify a respective tap target area associated with a respective graphical element among the multiple of graphical elements that corresponds to the smallest respective distance.

As further shown in FIG. 5, each of the aforementioned modules can be configured to communicate between each other. For instance, different data, messages, API calls and returns can be passed between the different modules in the system 505. Moreover, as illustrated, the system 505 is configured to communicate over a network 550 with website 560 or other website(s) 570 and/or vice versa.

Figure 6:
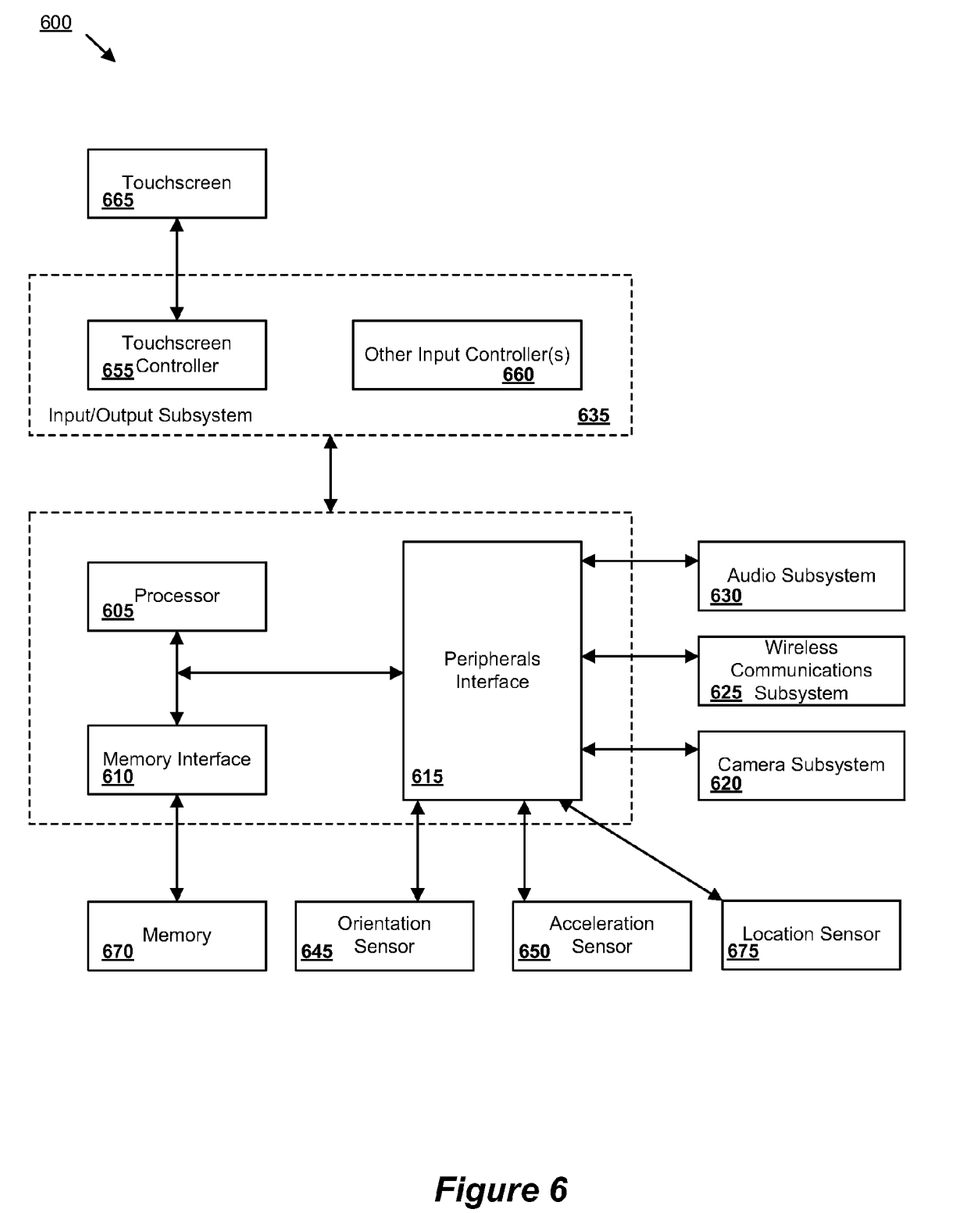
FIG. 6 conceptually illustrates an example of a mobile device architecture.

FIG. 6 is an example of a mobile device architecture 600. The implementation of a mobile device can include one or more processing units 605, memory interface 610 and a peripherals interface 615. Each of these components that make up the computing device architecture can be separate components or integrated in one or more integrated circuits.

These various components can also be coupled together by one or more communication buses or signal lines.

The peripherals interface 615 can be coupled to various sensors and subsystems, including a camera subsystem 620, a wireless communication subsystem(s) 625, audio subsystem 630 and Input/Output subsystem 635. The peripherals interface 615 enables communication between processors and peripherals. The peripherals provide different functionality for the mobile device. Peripherals such as an orientation sensor 645 or an acceleration sensor 650 can be coupled to the peripherals interface 615 to facilitate the orientation and acceleration functions. Additionally, the mobile device can include a location sensor 675 to provide different location data. In particular, the location sensor can utilize a Global Positioning System (GPS) to provide different location data such as longitude, latitude and altitude.

The camera subsystem 620 can be coupled to one or more optical sensors such as a charged coupled device (CCD) optical sensor or a complementary metal-oxide-semiconductor (CMOS) optical sensor. The camera subsystem 620 coupled with the sensors can facilitate camera functions, such as image and/or video data capturing. Wireless communication subsystems 625 can serve to facilitate communication functions. Wireless communication subsystems 625 can include radio frequency receivers and transmitters, and optical receivers and transmitters. The aforementioned receivers and transmitters can be implemented to operate over one or more communication networks such as a Long Term Evolution (LTE), Global System for Mobile Communications (GSM) network, a Wi-Fi network, Bluetooth network, etc. The audio subsystem 630 is coupled to a speaker and a microphone to facilitate voice-enabled functions, such as voice recognition, digital recording, etc.

I/O subsystem 635 involves the transfer between input/output peripheral devices, such as a display, a touchscreen, etc., and the data bus of the processor 605 through the Peripherals Interface. I/O subsystem 635 can include a touchscreen controller 655 and other input controllers 60 to facilitate these functions. Touchscreen controller 655 can be coupled to the touchscreen 65 and detect contact and movement on the screen using any of multiple touch sensitivity technologies. Other input controllers 60 can be coupled to other input/control devices, such as one or more buttons.

Memory interface 610 can be coupled to memory 670, which can include high-speed random access memory and/or non-volatile memory such as flash memory. Memory 670 can store an operating system (OS). The OS can include instructions for handling basic system services and for performing hardware dependent tasks.

By way of example, memory can also include communication instructions to facilitate communicating with one or more additional devices, graphical user interface instructions to facilitate graphic user interface processing, image/video processing instructions to facilitate image/video-related processing and functions, phone instructions to facilitate phone-related processes and functions, media exchange and processing instructions to facilitate media communication and processing-related processes and functions, camera instructions to facilitate camera-related processes and functions, and video conferencing instructions to facilitate video conferencing processes and functions. The above identified instructions need not be implemented as separate software programs or modules. Various functions of mobile device can be implemented in hardware and/or in software, including in one or more signal processing and/or application specific integrated circuits.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

The following description describes an example system in which aspects of the subject technology can be implemented.

Figure 7:
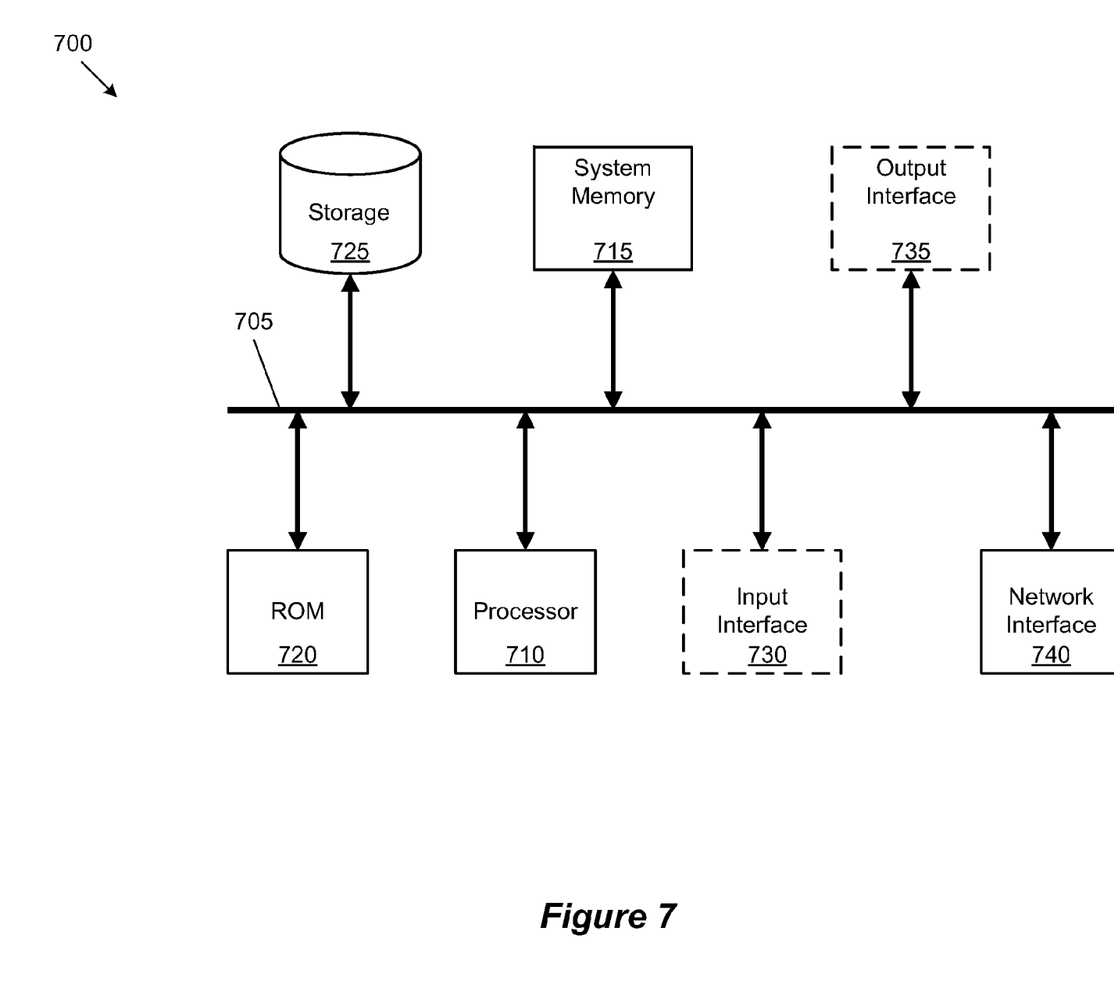
FIG. 7 conceptually illustrates a system with which some implementations of the subject technology may be implemented.

FIG. 7 conceptually illustrates a system 700 with which some implementations of the subject technology can be implemented. The system 700 can be a computer, phone, PDA, or another sort of electronic device. In some configurations, the system 700 includes a television with one or more processors embedded therein. Such a system includes various types of computer readable media and interfaces for various other types of computer readable media. The system 700 includes a bus 705, processing unit(s) 710, a system memory 715, a read-only memory 720, a storage device 725, an optional input interface 730, an optional output interface 735, and a network interface 740.

The bus 705 collectively represents all system, peripheral, and chipset buses that communicatively connect the numerous internal devices of the system 700. For instance, the bus 705 communicatively connects the processing unit(s) 710 with the read-only memory 720, the system memory 715, and the storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the system 700. The storage device 725, on the other hand, is a read-and-write memory device. This device is a non-volatile memory unit that stores instructions and data even when the system 700 is off. Some implementations of the subject technology use a mass-storage device (such as a magnetic or optical disk and its corresponding disk drive) as the storage device 725.

Other implementations use a removable storage device (such as a flash drive, a floppy disk, and its corresponding disk drive) as the storage device 725. Like the storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the subject technology's processes are stored in the system memory 715, the storage device 725, and/or the read-only memory 720. For example, the various memory units include instructions for processing multimedia items in accordance with some implementations. From these various memory units, the processing unit(s) 710 retrieves instructions to execute and data to process in order to execute the processes of some implementations.

The bus 705 also connects to the optional input and output interfaces 730 and 735. The optional input interface 730 enables the user to communicate information and select commands to the system. The optional input interface 730 can interface with alphanumeric keyboards and pointing devices (also called "cursor control devices"). The optional output interface 735 can provide display images generated by the system 700. The optional output interface 735 can interface with printers and display devices, such as cathode ray tubes (CRT) or liquid crystal displays (LCD). Some implementations can interface with devices such as a touchscreen that functions as both input and output devices.

Finally, as shown in FIG. 7, bus 705 also couples system 700 to a network interface 740 through a network adapter (not shown). In this manner, the computer can be a part of a network of computers (such as a local area network ("LAN"), a wide area network ("WAN"), or an Intranet, or an interconnected network of networks, such as the Internet. The components of system 700 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." An aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method, the method comprising:
    receiving content over a network, wherein the content comprises a plurality of graphical elements and a respective size definition of a respective tap target area associated with each of the plurality of graphical elements;
    detecting a first touch input on a touch-sensitive screen, wherein the first touch input corresponds with a position on the touch-sensitive screen;
    determining if the position of the first touch input is within a predetermined distance of the respective tap target area associated with one of the plurality of graphical elements, wherein each of the plurality of graphical elements is provided by a user interface associated with a first application;
    expanding, by a second application or an operating system if the position of the first touch input is determined to be within the predetermined distance, the respective tap target area of the one of the plurality of graphical elements by a predetermined amount to increase an area of the respective tap target area of the one of the plurality of graphical elements while maintaining the respective size definition of the respective tap target area associated with each remaining graphical element of the plurality of graphical elements and without moving the respective tap target area associated with each remaining graphical element of the plurality of graphical elements, the expanded tap target area comprising a boundary and a region enclosed by the boundary, wherein the region of the expanded tap target area does not extend into the respective tap target area associated with each remaining graphical element of the plurality of graphical elements;
    receiving a second touch input on the touch-sensitive screen, wherein the second touch input corresponds with a second position on the touch-sensitive screen;
    determining if the second position of the second touch input is within the expanded tap target area; and
    selecting the graphical element associated with the expanded tap target area in response to the second position of the second touch input being within the expanded tap target area.

2. The method of claim 1, wherein:
    the first touch input is a tap input, and
    the position and the second position are different positions on the touch-sensitive screen.

3. The method of claim 1, wherein the second touch input comprises a gesture from the position of the first touch input to the second position of the second touch input.

4. The method of claim 1, wherein the plurality of graphical elements is provided on a web page.

5. The method of claim 1, wherein each of the plurality of graphical elements comprises at least one of a button or a selectable interface object.

6. A computer-implemented method, the method comprising:
receiving content over a network, wherein the content comprises a plurality of graphical elements and a respective size definition of a respective tap target area associated with each of the plurality of graphical elements;
detecting a first touch input on a touch-sensitive screen, wherein the first touch input corresponds with a position on the touch-sensitive screen;
determining if the position of the first touch input is within a predetermined distance of the plurality of tap target areas respectively associated with the plurality of graphical elements, wherein the plurality of graphical elements is provided by a user interface associated with a first application;
identifying a tap target area among the plurality of tap target areas that is closer to the position of the first touch input;
expanding, by a second application or an operating system, the identified tap target area by a predetermined amount to increase an area of the identified tap target area while maintaining the respective size definition of the respective tap target area associated with each remaining graphical element of the plurality of graphical elements and without moving the respective tap target area associated with each remaining graphical element of the plurality of graphical elements, the expanded tap target area comprising a boundary and a region enclosed by the boundary, wherein the region of the expanded tap target area does not extend into the respective tap target area associated with each remaining graphical element of the plurality of graphical elements;
receiving a second touch input on the touch-sensitive screen, wherein the second touch input corresponds with a second position on the touch-sensitive screen;
determining if the second position of the second touch input is within the expanded tap target area; and
selecting the graphical element associated with the expanded tap target area in response to the second position of the second touch input being within the expanded tap target area.

7. The method of claim 6, wherein the second touch input comprises a gesture from the position of the first touch input.

8. The method of claim 6, wherein identifying the tap target area among the plurality of tap target areas that is closer to the position of the first touch input comprises:
determining respective distances from the position of the first touch input to the respective tap target area of the plurality of tap target areas; and
determining a smallest respective distance among the respective distances from the position of the first touch input; and
identifying the respective tap target area associated with the respective graphical element among the plurality of graphical elements that corresponds to the smallest respective distance.

9. The method of claim 6, wherein the plurality of graphical elements are provided in a graphical user interface (GUI), the GUI comprising a total display area, and each of the plurality of graphical elements are arranged in different display areas within the total display area of the GUI.

10. The method of claim 6, wherein the predetermined distance comprises a distance based on a number of pixels.

11. The method of claim 6, wherein the predetermined amount to increase the area of the tap target area comprises a coefficient to multiply the area of the tap target area.

12. The method of claim 11, wherein the coefficient is greater than 1.

13. A system, the system comprising:
memory;
one or more processors;
one or more modules stored in memory and configured for execution by the one or more processors, the modules comprising:
a tap target module configured to:
detect a first touch input on a touch-sensitive screen, wherein the first touch input corresponds with a position on the touch-sensitive screen,
determine if the position of the first touch input is within a predetermined distance of a tap target area associated with one of a plurality of graphical elements, wherein the plurality of graphical elements is provided to the tap target module by a user interface associated with a first application,
if the position of the first touch input is determined to be within the predetermined distance, expand the tap target area by a predetermined amount to increase an area of the tap target area while maintaining a respective size definition of a respective tap target area associated with each remaining graphical element of the plurality of graphical elements and without moving the respective tap target area associated with each remaining graphical element of the plurality of graphical elements, the expanded tap target area comprising a boundary and a region enclosed by the boundary, wherein the region of the expanded tap target area does not extend into the respective tap target area associated with each remaining graphical element of the plurality of graphical elements,
receive a second touch input on the touch-sensitive screen, wherein the second touch input corresponds with a second position on the touch-sensitive screen, and
determine if the second position of the second touch input is within the expanded tap target area; and
a graphical user interface (GUI) display module configured to select the graphical element associated with the expanded tap target area in response to the second position of the second touch input being within the expanded tap target area,
wherein the system is configured to receive content over a network, the content comprising the plurality of graphical elements and the respective size definition of the respective tap target area associated with each of the plurality of graphical elements.

14. The system of claim 13, wherein the tap target module is further configured to:
detect a first respective touch input on a touch-sensitive screen, wherein the first respective touch input corresponds with a position on the touch-sensitive screen;

determine if the position of the first respective touch input is within a predetermined distance of the plurality of tap target areas respectively associated with the plurality of graphical elements;

identify the respective tap target area among the plurality of tap target areas that is closer to the position of the first respective touch input;

expand the respective tap target area by a predetermined amount to increase an area of the respective tap target area;

receive a second respective touch input on the touch-sensitive screen, wherein the second respective touch input corresponds with a second position on the touch-sensitive screen; and determine if the second position of the second respective touch input is within the expanded respective tap target area.

15. The system of claim 14, wherein the GUI display module is further configured to:

select the graphical element associated with the expanded respective tap target area in response to the second position of the second respective touch input being within the expanded respective tap target area.

16. The system of claim 14, wherein the tap target module is further configured to:

determine respective distances from the position of the first respective touch input to the respective tap target area of the plurality of tap target areas; and determine a smallest respective distance among the respective distances from the position of the first respective touch input; and identify the respective tap target area associated with the respective graphical element among the plurality of graphical elements that corresponds to the smallest respective distance.

17. The system of claim 13, wherein the tap target module is configured to expand the tap target area without changing the size definition of the tap target area.

18. A non-transitory machine-readable medium comprising instructions stored therein, which when executed by a machine, cause the machine to perform operations comprising:

receiving content over a network, wherein the content comprises a plurality of graphical elements and a respective size definition of a respective tap target area associated with each of the plurality of graphical elements;

detecting a first touch input on a touch-sensitive screen, wherein the first touch input corresponds with a position on the touch-sensitive screen;

determining if the position of the first touch input is within a predetermined distance of the plurality of tap target areas respectively associated with the plurality of graphical elements, wherein the plurality of graphical elements is provided by a user interface associated with a first application;

determining respective distances from the position of the first touch input to the respective tap target area of the plurality of tap target areas;

determining a smallest respective distance among the respective distances from the position of the first touch input;

identifying the respective tap target area associated with the respective graphical element among the plurality of graphical elements that corresponds to the smallest respective distance;

expanding, by a second application or an operating system, the identified respective tap target area by a predetermined amount to increase an area of the identified respective tap target area while maintaining the respective size definition of the respective tap target area associated with each remaining graphical element of the plurality of graphical elements and without moving the respective tap target area associated with each remaining graphical element of the plurality of graphical elements, the expanded tap target area comprising a boundary and a region enclosed by the boundary, wherein the region of the expanded tap target area does not extend into the respective tap target area associated with each remaining graphical element of the plurality of graphical elements;

receiving a second touch input on the touch-sensitive screen, wherein the second touch input corresponds with a second position on the touch-sensitive screen;

determining if the second position of the second touch input is within the expanded tap target area; and selecting the graphical element associated with the expanded tap target area in response to the second position of the second touch input being within the expanded tap target area.

19. The non-transitory machine-readable medium of claim 18, wherein:

the plurality of graphical elements is provided on a web page in the first application, the respective size definition of each respective tap target area is provided on the web page by the first application, and the expanding comprises expanding, by the second application or the operating system, the identified respective tap target area without changing code associated with the web page.

20. The non-transitory machine-readable medium of claim 18, wherein the expanding is performed by the second application.

* * * * *